W. E. SHARP.
LOCK NUT AND PROCESS OF MAKING THE SAME.
APPLICATION FILED SEPT. 8, 1916.
1,271,782.
Patented July 9, 1918.
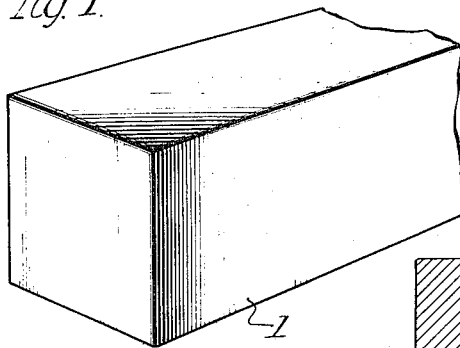
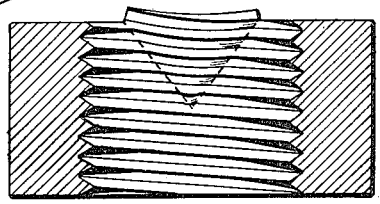
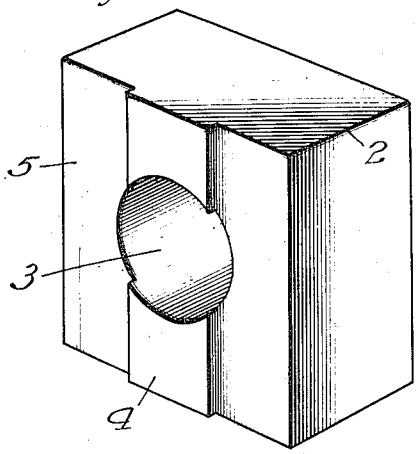
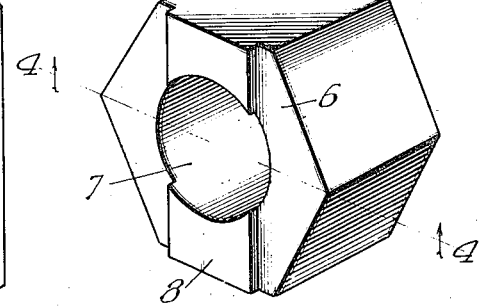
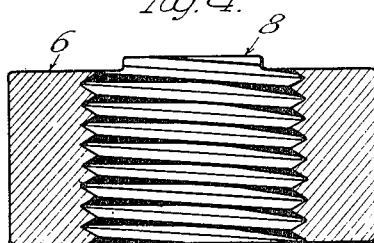
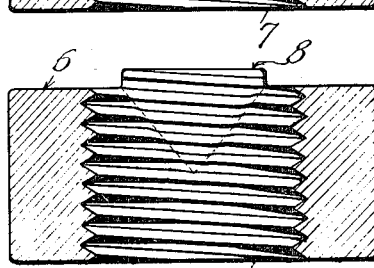
Witnesses:
Robert H. Weir
Arthur W. Carlson
Inventor
William E. Sharp
By Hill & Hill Attys

UNITED STATES PATENT OFFICE.

WILLIAM E. SHARP, OF CHICAGO, ILLINOIS, ASSIGNOR TO GRIP NUT COMPANY, OF CHICAGO, ILLINOIS, A CORPORATION OF ILLINOIS.

LOCK-NUT AND PROCESS OF MAKING THE SAME.

1,271,782.  Specification of Letters Patent.  Patented July 9, 1918.

Application filed September 8, 1916.  Serial No. 119,123.

*To all whom it may concern:*

Be it known that I, WILLIAM E. SHARP, a citizen of the United States, residing at Chicago, in the county of Cook and State of Illinois, have invented certain new and useful Improvements in Lock-Nuts and Processes of Making the Same, of which the following is a description.

My invention relates to an improved lock nut and novel method and process of forming the same. More particularly the invention has to do with the class of nuts specially constructed to be readily threaded upon a coöperating bolt and accurately bind upon the bolt as they are turned down thereon, so that the nuts are not readily disengaged by vibration or jar. The object of the invention is to provide an improved simple and efficient lock nut of the type referred to, and a simple and economical method of producing such nuts.

To this end my invention consists in the novel construction and method herein shown and described, and more particularly pointed out in the claims.

In the drawings, wherein like reference characters indicate like or corresponding parts, Figure 1 is a perspective view indicating a suitable bar of iron or metal from which my improved nuts may be made;

Fig. 2 indicates a square nut blank produced from said bar, as the second step in the process of manufacturing the nuts;

Fig. 3 is a similar view of a nut of hexagonal form, which may likewise be stamped or produced from the bar in the initial step of producing the nuts;

Fig. 4 is a section on line 4—4 of Fig. 3, showing the nut as initially threaded, and Fig. 5 is the same section showing the deflection or curve of a portion of the threads of the nut in the finished product.

Fig. 6 is a section similar to Fig. 4 illustrating a slightly modified construction.

In the drawings, 1 indicates a bar of suitable metal of a size and form adapted to most readily be converted into the form of nuts described. These nuts are formed by what is sometimes called the hot press process, that is the bar is suitably heated, and is then passed into a press, where the nut is cut from the bar, the bolt hole punched therein, and the general form of the nut completed. 2 is a nut blank of the usual square form cut from such a bar, in which 3 is a bolt hole, which, as shown in Fig. 2, is not yet threaded. Upon one face of the nut is a centrally-disposed ridge 4, the width of which is less than the diameter of the bolt hole, as indicated. Thus the bolt hole cuts through the entire width of the ridge, leaving the two ends thereof elevated above the face 5 of the nut, as indicated.

Fig. 3 indicates a similar nut of hexagonal form, cut from the bar 1, 6 indicating the face of the nut, 7 the bolt hole and 8 the transverse ridge. The ridge is formed in the press at the same time the nut is cut and the hole punched therein, the blank after coming from the press is similar to the blank shown in Fig. 2 or that shown in Fig. 3, as desired.

The blank thus prepared is then screw-threaded in any usual manner, the thread extending from one face of the nut to the other, and terminating in the ridge, as indicated. After this is done the nut is then passed through a suitable press or squeezing device, the base of the nut resting upon a suitable flat base or anvil, with the ridge of the nut upward, and pressure is brought squarely upon the ridge on both sides of the bolt hole, slightly compressing the metal directly beneath toward the opposite face of the nut, with the result that the proximate threads beneath the ridge on each side of the bolt hole are caused to assume a slightly abnormal position, in which the thread nearest the top of the ridge is compressed its entire length, the compressed portion of the next thread being slightly shorter, but substantially parallel to the first thread, and so continuing until the modification ceases at some point within the body of the nut, preferably about the center thereof, as indicated in Fig. 5.

On both sides of the compressed portion, and transverse to the ridge, the threads in the nut are normal, and are not affected, while in line with the ridge, as stated, the threads are slightly compressed and permanently set in such position, the compressed parts gradually tapering downward, as shown.

As a matter of fact this pressing action also has a tendency to lessen the distance between the contiguous threads at the points thus depressed. If sufficient pressure is exerted to compress the threads entirely through the nut, this lessening of the distance between the threads may be such as to coöperate in binding the nut on the bolt, increasing the binding effect, and thus becoming an important function in the use of the nut.

Where, however, the pressure is such that the compression of the thread extends only part way through the nut, such shortening of the distance between the threads is not sufficient to bring that function into action as a rule, and is negligible, the friction of the compressed threads being relied upon.

In the preferred construction the modification extends about midway of the nut, as indicated in Fig. 5, the compressed portion of the succeeding threads being shortened, as indicated, causing the modified part to apparently approach a point where it disappears. Obviously, however, the relative pressure upon the nut will govern the distance the effect will extend into the nut.

In practical effect the metal apparently flows in the direction of the pressure, and assumes a permanent set, so that the nut may be mounted upon a bolt and removed several times without materially reducing its locking effect thereon.

In practical use I have secured very satisfactory results by constructing the nut with the width of the ridge substantially eighty-five per cent. of the diameter of the bolt hole, and the height of the ridge less than one per cent. of the thickness of the nut. In all cases, to secure the effect described and the best results, the width of the ridge should be less than the diameter of the bolt hole, thus effectively controlling the field affected by the compression described.

I have described the effect of compression on the ridge when a straight or flat faced compressing tool coöperates with the ridge on the nut. Obviously a "ball faced," or convex faced compressing tool may be used, in which case the modified parts of the thread will be slightly curved downwardly, as shown in Fig. 6, instead of being substantially straight.

Having thus described my invention, what I claim as new and desire to secure by Letters Patent is:—

1. The herein described process of producing a lock nut consisting in forming a blank of substantially equal thickness throughout and solid except for the bolt hole with a centrally disposed rectangular shaped ridge of less width than the diameter of the bolt hole extending across one face thereof intersected by the bolt hole, and forming a thread in said nut, and thereafter placing the same upon a flat surface and applying pressure to the face of the ridge, whereby part of the threads in line with the ridge on each side of the bolt hole are modified, the compressed part of the topmost thread in each case being of a length substantially of the width of the ridge, and the compressed part of each succeeding modified thread being slightly less in length as they approach toward the other face of the nut.

2. The herein described process of forming a lock nut, consisting in forming a blank with a centrally-disposed ridge of less width than the diameter of the bolt hole extending across one face thereof intersected by the bolt hole, and forming a thread in said nut, and thereafter placing the same upon a flat surface and applying pressure to the face of the ridge, whereby part of the threads in line with the ridge on each side of the bolt hole are modified, the compressed part of the topmost thread in each case being of a length substantially of the width of the ridge, and the compressed part of each succeeding modified thread being slightly less in length as they approach toward the other face of the nut.

3. A lock nut, comprising a threaded bolt nut provided with a centrally-disposed ridge across one face thereof severed by the bolt hole, the width of the ridge being less than the diameter of the bolt hole, the thread at the ridge being slightly compressed toward the other face of the nut, each succeeding thread of the nut beneath the ridge being likewise compressed, but successively shortened in length and disappearing within the body of the nut.

4. A lock nut, comprising a threaded bolt nut provided with a centrally-disposed ridge across one face thereof severed by the bolt hole, the width of the ridge being less than the diameter of the bolt hole, and the thread on the ridge being slightly compressed toward the other face of the nut, the length of the compressed portion being substantially that of the width of the ridge, and each succeeding thread beneath the ridge being likewise compressed, but the length of the compressed portions being gradually decreased as they approach toward the other face of the nut.

5. A lock-nut comprising a threaded bolt nut provided with a centrally disposed ridge across one face thereof severed by the bolt hole, the threads at the ridge being slightly compressed toward the other face of the nut, each succeeding thread of the nut beneath the ridge being likewise compressed, but successively shortened in length and disappearing within the body of the nut.

6. A lock-nut comprising a threaded bolt nut provided with a centrally disposed flat faced ridge across one face thereof severed by the bolt hole, the width of the ridge being less than the diameter of the bolt hole, the threads formed in the ridge being slightly compressed toward the other face of the nut, each succeeding thread of the nut beneath the ridge being likewise compressed, but successively shortened in length and disappearing within the body of the nut.

In testimony whereof, I have hereunto signed my name in the presence of two subscribing witnesses.

WILLIAM E. SHARP.

Witnesses:
 Roy W. Hill,
 Charles I. Cobb.